United States Patent [19]

Nagahama et al.

[11] Patent Number: 5,408,450
[45] Date of Patent: Apr. 18, 1995

[54] OPTICAL PICKUP APPARATUS

[75] Inventors: Toshiya Nagahama, Nara; Yoshio Yoshida; Yukio Kurata, both of Tenri, all of Japan

[73] Assignee: Sharp Kabushiki Kaisha, Osaka, Japan

[21] Appl. No.: 53,334

[22] Filed: Apr. 28, 1993

Related U.S. Application Data

[63] Continuation of Ser. No. 746,184, Aug. 15, 1991, abandoned, which is a continuation of Ser. No. 370,818, Jun. 23, 1989, abandoned.

[30] Foreign Application Priority Data

| Jun. 23, 1988 | [JP] | Japan | 63-157253 |
| Jun. 23, 1988 | [JP] | Japan | 63-157254 |
| Jun. 23, 1988 | [JP] | Japan | 63-157255 |

[51] Int. Cl.$^6$ .......................... G11B 7/135
[52] U.S. Cl. .................. 369/44.12; 369/44.24; 369/44.32; 369/103; 369/112
[58] Field of Search ............ 369/48, 47, 100, 109, 369/110, 44.23, 44.41, 275.1, 44.42, 44.12, 44.14, 44.28, 44.37, 103, 112, 116, 13, 44.24, 44.32, 120

[56] References Cited

U.S. PATENT DOCUMENTS

| 4,314,262 | 2/1982 | Reily | 369/275.1 X |
| 4,771,411 | 9/1988 | Greve | 369/44.23 X |
| 4,789,977 | 12/1988 | Oudenhuysen et al. | 369/109 X |
| 4,804,835 | 2/1989 | Ando | 369/44.42 |
| 4,817,072 | 3/1989 | Toice et al. | 369/44.23 X |
| 4,823,220 | 4/1989 | Milster et al. | 369/13 |
| 4,824,191 | 4/1989 | Kato et al. | 369/44.23 X |
| 4,826,270 | 5/1989 | Ophey et al. | 369/100 X |
| 4,835,378 | 5/1989 | Coops | 369/44.23 X |
| 4,835,761 | 5/1989 | Shikama et al. | 369/110 |
| 4,904,856 | 2/1990 | Nagahana et al. | 369/44.23 X |

FOREIGN PATENT DOCUMENTS

| 59-231736 | 12/1984 | Japan . |
| 60-28035 | 2/1985 | Japan . |
| 62-209733 | 9/1987 | Japan . |

OTHER PUBLICATIONS

"Hecht Optics, Second Edition", Hecht, "Antireflection Coatings", 1987, pp. 375–376.
"The Photonics Dictionary" 37th international Edition, 1991, p. D-7.

Primary Examiner—Aristotelis M. Psitos
Assistant Examiner—Muhammad N. Edun

[57] ABSTRACT

An optical pickup apparatus for reproducing information from an optical recording medium such as a compact disc comprising: a laser device; one or more diffraction devices; and a photodetector receiving a laser beam diffracted by the diffraction device. The surfaces of the diffraction device are provided with an antireflection coating. When the apparatus is used for the three-beam method, the two photodetecting areas in the photodetector for producing the tracking error signal are different in size and in positional relation to the laser device.

7 Claims, 4 Drawing Sheets

OPTICAL PICKUP APPARATUS

This application is a continuation of application Ser. No. 07/746,184, filed on Aug. 15, 1991, now abandoned, which is a continuation of application Ser. No. 07/370,818, filed on Jun. 23, 1989, now abandoned.

BACKGROUND OF THE INVENTION

1. Field of the Invention

This invention relates to an optical pickup apparatus which is useful in an optical information reproducing system such as a compact disc player and a video disc player.

2. Description of the Prior Art

In an optical information reproducing system such as a compact disc player or the like, an optical pickup apparatus is employed to reproduce information from a recording medium, e.g. a so-called compact disc. It has been proposed to use a diffraction device in such an optical pickup apparatus, thereby reducing the number of components of the optical pickup apparatus.

FIG. 6 shows a conventional optical pickup apparatus having a diffraction device. The optical pickup apparatus of FIG. 6 which obtains optical signals from a recording medium 16 comprises a semiconductor laser device 11 for emitting a laser beam, a diffraction device 13, a collimating lens 14, an object lens 15, and an photodetector 17. The photodetector 17 is disposed at the side of the semiconductor laser device 11.

A laser beam emitted from the semiconductor laser device 11 passes the diffraction device 13 and the collimating lens 14, and is then focused on the recording medium 16 by the object lens 15. The light beam reflected from the recording medium 16 passes again through the object lens 15 and the collimating lens 14, and then enters the diffraction device 13 to be diffracted. The first-order diffraction beam enters the photodetector 17 which converts optical signals incident thereon to an information signal, a focus error signal and a tracking error signal.

When the laser light beam emitted from the laser device 11 passes the diffraction device 13, the major part of the laser light beam propagates in the diffraction device as indicated by the arrows $A_4$, and a part of the laser light beam is reflected at the surface 13a of the diffraction device 13 as indicated by the arrows $A_3$. Then, a part of the laser light beam is reflected at the other surface 13b of the diffraction device 13 as indicated by the arrows $A_2$. The reflected light beams $A_2$ and $A_3$ also enter the photodetector 17.

In this way, the photodetector 17 receives the reflected light beams $A_2$ and $A_3$ in addition to the light beam reflected from the recording medium 16, resulting in that the output signals of the photodetector 17 are offset or biased.

When only the reflected light beam $A_2$ or $A_3$ is to be considered, the degree of the offset produced in the output signals of the photodetector 17 may remain within an acceptable range because the amounts of the reflected light beams $A_2$ and $A_3$ are small as compared with that of the light beam reflected from the recording medium 16. In a practical optical pickup apparatus, however, both the reflected beams $A_2$ and $A_3$ impinge on the photodetector 17, resulting in an offset which is not negligible. Hence, it has been difficult to properly detect information from the information signal or to accurately conduct focus control or tracking control.

This problem may be overcome by disposing, in the vicinity of the photodetector 17, a shield means for preventing the light beams $A_2$ and $A_3$ from entering the photodetector 17. However, this causes the optical pickup apparatus to be large in size and weight.

FIG. 7 shows another conventional optical pickup apparatus which is used for the three-beam method. The optical pickup apparatus of FIG. 7 which obtains optical signals from a recording medium 16 is provided with another diffraction device 12 in addition to the diffraction device 13. The photodetector 17 has six photodetecting regions 17a–17f, as shown in FIG. 8. The photodetecting regions 17a–17d convert optical signals incident thereon to an information signal and a focus error signal, and the photodetecting regions 17e and 17f cooperate to produce a tracking error signal.

A laser light beam emitted from the semiconductor laser device 11 is diffracted by the diffraction device 12 to be split into three separate beams; the main beam for producing an information signal and focus error signal in the three-beam method; and two sub-beams for producing a tracking error signal. The major portion of the beams propagates through the diffraction device 13, and then enters the object lens 15 via the collimating lens 14. Thereafter, these beams impinge on the recording medium 16, so that the main beam is focused on a pit of the recording medium 16 and the sub-beams are focused respectively on the positions in front of and behind the pit along the track direction.

The main beam and sub-beams focused on the recording medium 16 are reflected therefrom. Then, the reflected main beam and sub-beams pass again the object lens 15 and collimating lens 14, and are diffracted by the diffraction device 13 so that the main beam is focused on the photodetecting regions 17a–17d, and that the sub-beams are focused on the photodetecting regions 17e and 17f, respectively. The photodetecting regions 17e and 17f generate respectively outputs Se and Sf the level of each of which varies in accordance with the intensity of the sub-beam incident thereon. The tracking error signal can be obtained by calculating "Se−Sf".

In the three-beam method, when the tracking of the recording medium 16 is properly conducted, the sub-beam incident on the photodetecting region 17e is equal in intensity to that incident on the photodetecting region 17f so that the outputs Se and Sf are equal to each other, resulting in that the tracking error signal becomes zero. When the tracking of the recording medium 16 is not properly conducted, the sub-beam incident on the photodetecting region 17e is different in intensity from that incident on the photodetecting region 17f so that the outputs Se and Sf are different from each other, resulting in that the tracking error signal is not zero. The tracking error signal which is not zero causes the track servo control to be activated.

As shown in FIG. 9, the far field pattern of the laser light beam emitted from the semiconductor laser device 11 is an elliptical shape beam the center of which corresponds to the optical axis 11c, the minor axis of which is perpendicular to the optical axis 11c and parallel to the junction plane 11b of the laser device 11, and the major axis of which is perpendicular to the minor axis. Hence, the laser light beams incident on the recording medium 16 have an elliptical shape, but their spots formed on the recording medium 16 are changed in shape in accordance with the positional relationship between the laser device 11 and the photodetector 17.

When the photodetector 17 is positioned so that an angle $\theta$ formed by the junction plane 11b and the line extending between the laser spot 11a of the laser device 11 and the center of the photodetector 17 is 0 deg. or 180 deg., the spot of each laser light beam forms a long ellipse the major axis of which is perpendicular to the direction along the track (pit train), resulting in that the spot stretches to the adjacent tracks. This may cause the tracking error signal to be erroneously generated. When the photodetector 17 is positioned so that the angle $\theta$ is 90 deg. or 270 deg., in contrast, the spot of each laser light beam forms a long ellipse the major axis of which coincides with the direction along the track, resulting in inferior resolution while reading the length of the pit. In an actual optical pickup apparatus, therefore, the photodetector 17 is disposed at a position so that the angle $\theta$ has a value other than 0, 90, 180 and 270 deg., thereby obtaining the information signal in an improved quality.

The laser light beam emitted from the semiconductor laser device 11 is partly reflected by the diffraction devices 12 and 13, a member (not shown) for supporting the optical system, and holders (not shown) for mounting each optical elements, to become so-called stray light which does not contribute to the detection of signals such as the information signal. Particularly, the stray light SL (FIG. 8) caused by the reflection at the diffraction devices 12 and 13 enters into the photodetector 17. The photodetector 17 receiving the stray light SL outputs signals based on the stray light.

As shown in FIG. 8, the optical intensity of the stray light SL distributes in an elliptical shape in the same manner as the laser light beam emitted from the laser device 11. When the photodetector 17 is disposed at a position so that the angle $\theta$ has a value other than 0, 90, 180 and 270 deg., therefore, the amount of the stray light SL received by the photodetecting region 17e is different from that received by the photodetecting region 17f, causing an offset in the tracking error signal. Even when the tracking control of the recording medium 16 is properly conducted, the photodetecting region 17f receives the stray light SL in a greater amount than the photodetecting region 17e, i.e., the output signal Sf of the photodetecting region 17f becomes greater than the output signal Se of the photodetecting region 17e (Se<Sf), so that the tracking error signal (Se−Sf) is not zero. This causes tracking control to be performed incorrectly.

In order to obtain an optical pickup apparatus reduced in size and weight, it is necessary to position the photodetector 17 in close proximity to the semiconductor laser device 11. As the intensity of the stray light SL in an optical pickup device distributes in accordance with the Gaussian distribution, the smaller the distance between the laser device 11 and the photodetector 17, the greater the offset in the tracking error signal. Hence, it has been difficult to reduce the size and/or weight of an optical pickup apparatus.

SUMMARY OF THE INVENTION

The optical pickup apparatus of this invention, which overcomes the above-discussed and numerous other disadvantages and deficiencies of the prior art, comprises a laser light source for emitting a laser light beam; an optical lens system for converging the laser light onto a recording medium; a photodetector for detecting the laser light beam reflected from the recording medium; and a diffracting means disposed in the optical path extending between said laser light source and the recording medium, said diffracting means being provided with an antireflection means for preventing the laser light from being reflected.

In a preferred embodiment, the antireflection means comprises an antireflection film formed on each of the two surfaces of said diffraction means.

The optical pickup apparatus of this invention comprises a laser light source for emitting a laser light beam; an optical lens system for converging the laser light onto a recording medium; a photodetector for detecting the laser light beam reflected from the recording medium; and a diffracting means disposed in the optical path extending between said laser light source and the recording medium, said diffracting means dividing the laser light beam into three light beams for the three-beam method, said photodetector comprises two photodetecting regions onto which two of said three light beams impinge respectively to produce a tracking error signal, the effective photodetecting areas of said photodetecting regions being different in size from each other.

In another preferred embodiment, the distance between one of said two photodetecting regions and said laser light source is different from that between the other of said two photodetecting regions and said laser light source.

In another preferred embodiment, the diffracting means is provided with an antireflection means for preventing the laser light from being reflected.

The optical pickup apparatus of this invention comprises a laser light source for emitting a laser light beam; an optical lens system for converging the laser light onto a recording medium; a photodetector for detecting the laser light beam reflected from the recording medium; and a diffracting means disposed in the optical path extending between said laser light source and the recording medium, said diffracting means dividing the laser light beam into three light beams for the three-beam method, said photodetector comprises two photodetecting regions onto which two of said three light beams impinge respectively to produce a tracking error signal, the distance between one of said two photodetecting regions and said laser light source being different from that between the other of said two photodetecting regions and said laser light source.

In another preferred embodiment, the effective photodetecting areas of said photodetecting regions are different in size from each other.

In another preferred embodiment, the diffracting means is provided with an antireflection means for preventing the laser light from being reflected.

Thus, the invention described herein makes possible the objectives of (1) providing an optical pickup apparatus which can generate a tracking error signal having no offset; (2) providing an optical pickup apparatus which can generate a correct tracking error signal; (3) providing an optical pickup apparatus the size of which can be reduced; and (4) providing an optical pickup apparatus the weight of which can be reduced.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
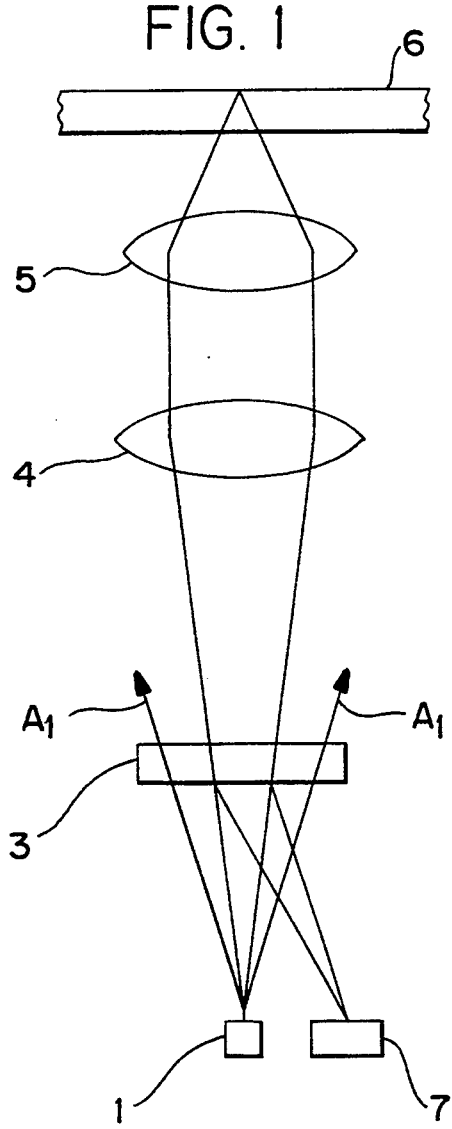
FIG. 1 shows diagrammatically an optical pickup apparatus of the present application.

FIG. 1 shows an optical pickup apparatus according to the present invention. The apparatus of FIG. 1 comprises a semiconductor laser device 1 for emitting a laser light beam, a diffraction device 3, a collimating lens 4, an object lens 5, and an photodetector 7. The photodetector 7 is disposed at the side of the semiconductor laser device 1. A laser beam emitted from the semiconductor is directed via the optical system to a recording medium 6 passes the diffraction device 3 and the collimating lens 4, and then focused on a recording medium 6 by the object lens 5. The light beam reflected from the recording medium 6 again passes through the object lens 5 and the collimating lens 4, and then enters the diffraction device 3 to be diffracted. The diffraction beam from the diffraction device 3 enters the photodetector 7 which converts optical signals incident thereon to an information signal, a focus error signal and a tracking error signal.

Figure 2:
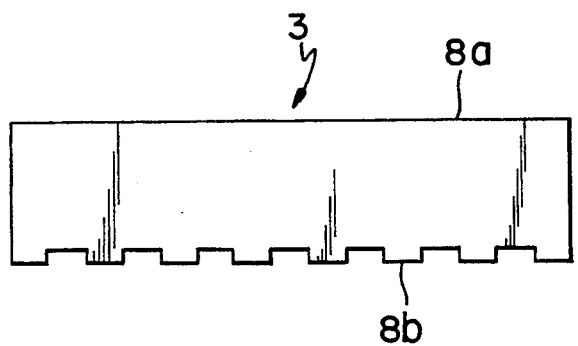
FIG. 2 is a side elevation view of the diffraction device used in the apparatus of FIG. 1.

As shown in FIG. 2, a diffraction grating is formed on the surface of the diffraction device 3 which faces the laser device 1. The diffraction device 3 is provided with an antireflection film 8a at the surface facing the recording medium 6, and also with an antireflection film 8b at the surface facing the laser device 1. Therefore, the laser light beam emitted from the laser device 1 is substantially prevented from being reflected by the diffraction device 3. Alternatively, only one of the surfaces of the diffraction device 3 may be provided with such an antireflection film. The manner of forming the antireflection film(s) is not restricted to the above.

In the optical pickup apparatus having the above-described structure, a very small portion of the laser light beam emitted from the semiconductor laser device 1 may be reflected by the diffraction device 3 while a major portion of the laser beam passes the diffraction device 3 as indicated by the arrows A₁ (FIG. 1).

Although a portion of the light beam reflected by the diffraction device 3 may be incident on the photodetector 7, the amount of the stray light is very small as compared with that of the light beam reflected from the recording medium and incident on the photodetector 7 and the degree of the offset appearing in the output signals of the photodetector 7 is very small.

Figure 3:
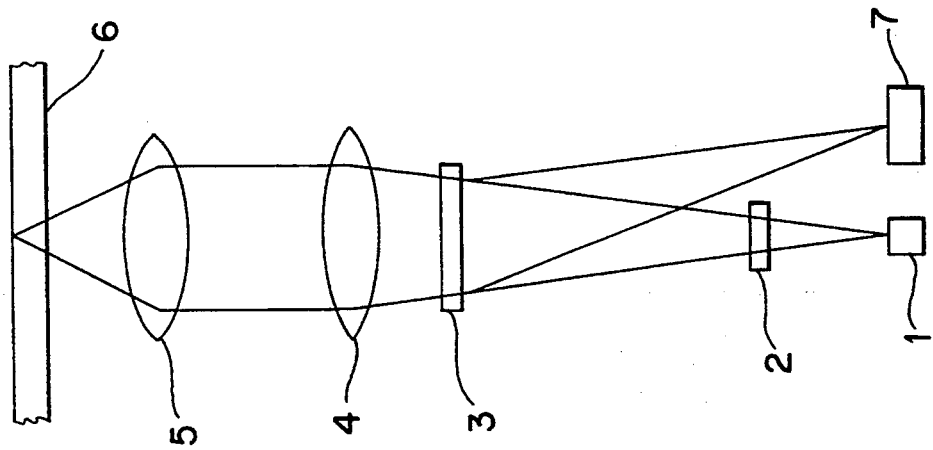
FIG. 3 shows diagrammatically another optical pickup apparatus of the present application.

FIG. 3 shows another apparatus according to the present application. The apparatus of FIG. 3 is used for conducting the three-beam method, and is provided with a further diffraction device 2 between the semiconductor laser device 1 and the diffraction device 3. The laser light beam emitted from the laser device 1 is diffracted by the diffraction device 2 to be separated into a zero-order diffracted beam (main beam) and a pair of first-order diffracted beams (sub beams). The diffraction device 3 further diffracts the laser light beam to provide the laser beam reflected from the recording medium with an astigmatism, so that the laser light beam is directed to the photodetector 7.

Figure 4:
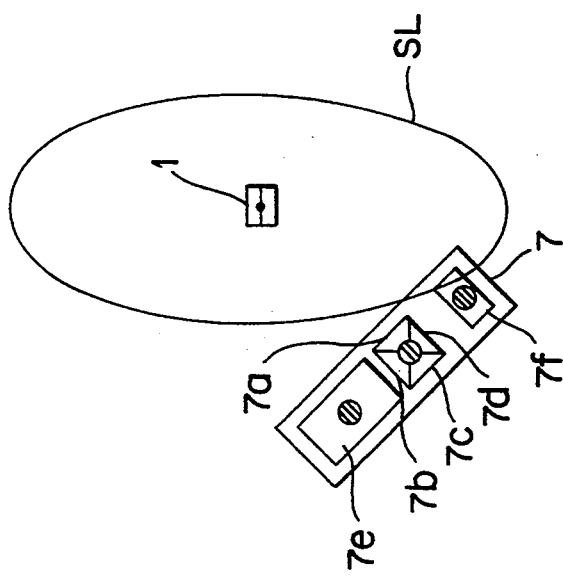
FIG. 4 shows the positional relation between the photodetector and the semiconductor laser device in the apparatus of FIG. 3.

The photodetector 7 is disposed at the side of the laser device 1, and, as shown in FIG. 4, comprises six photodetecting regions 7a-7f. The four photodetecting regions 7a-7d are positioned at the center of the photodetector 7, and gathered to form a square. In other words, the four quarters of a square divided by the two diagonal lines constitute the regions 7a-7d, respectively. The photodetecting regions 7e and 7f are positioned respectively at both end portions of the photodetector 7 to sandwich the assembly of the photodetecting regions 7a-7d. The effective photodetecting areas of the regions 7e and 7f are different in size from each other so that the amount of the light beam incident on one of the regions 7e and 7f is equal to that of the light beam incident on the other of the regions 7e and 7f.

Figure 7:
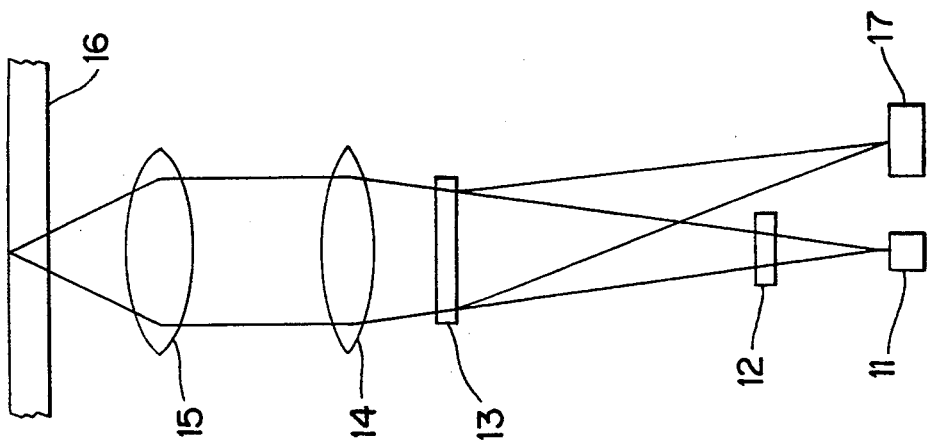
FIG. 7 shows diagrammatically another prior art optical pickup apparatus.
Figure 6:
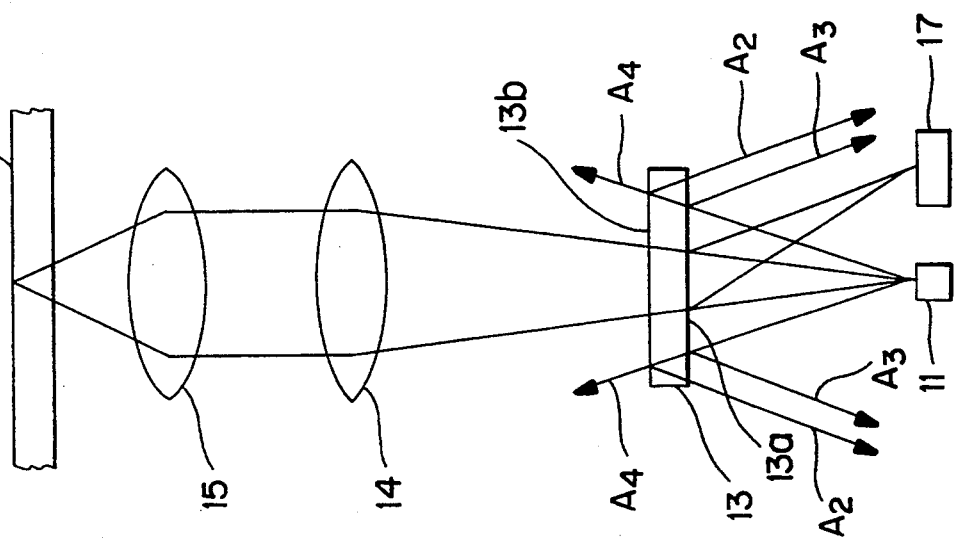
FIG. 6 shows diagrammatically a prior art optical pickup apparatus.
Figure 8:
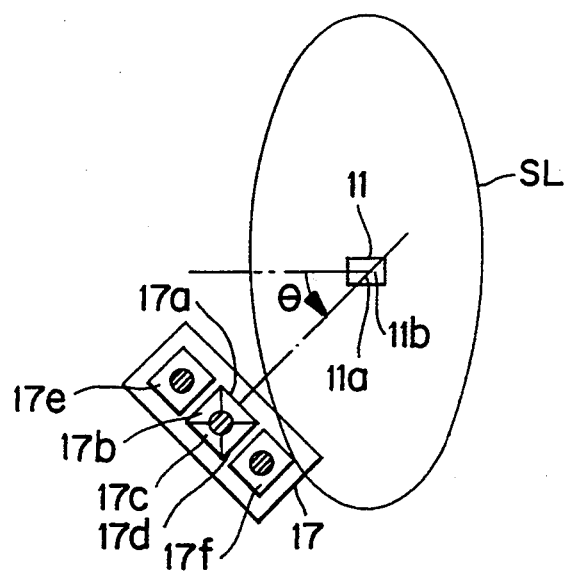
FIG. 8 shows the positional relation between the photodetector and the semiconductor laser device in the apparatus of FIG. 7.
Figure 9:
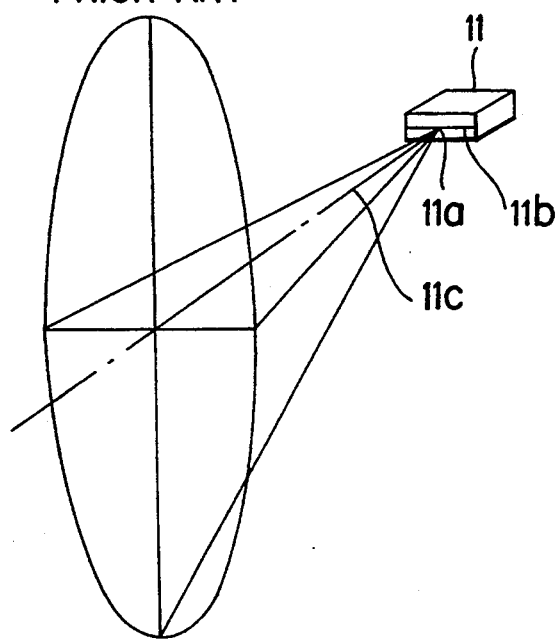
FIG. 9 is diagram illustrating the far field of a semiconductor laser device.

In the same manner as the apparatus of FIG. 7, the main beam and sub beams reflected from the recording medium 6 are diffracted by the diffraction device 3, and the first-order diffracted beams of the main beam and sub beams are directed to the photodetector 7, so that the main beam impinges on the point of intersection of the diagonal lines in the assembly of the photodetecting regions 7a-7d and so that the sub beams impinge on the regions 7e and 7f, respectively.

The photodetecting regions 7a-7f produce optical outputs Sa-Sf, respectively. According to the astigmatic method, the focus signal is obtained by the calculation of "(Sa+Sc)−(Sb+Sd)". The tracking error signal is detected in the three-beam method by calculating "Se−Sf". The information signal is obtained by calculating "Sa+Sb+Sc+Sd".

As described above, in the apparatus of FIG. 3, the sizes of the effective photodetecting areas of the photodetecting regions 7e and 7f have been selected in such a manner that the amounts of the light beams incident thereon are equal to each other (i.e., Se=Sf) when the tracking control is conducted properly. Therefore, the tracking error signal has no offset or equals zero when the tracking control is conducted properly. As the effective photodetective area of each of the two photodetecting regions 7e and 7f can be freely set considering the amount of the stray light impinging thereon, the photodetector 7 can be disposed closer to the semiconductor laser device 1, resulting in the reduced size and weight of the optical pickup apparatus.

Figure 5:
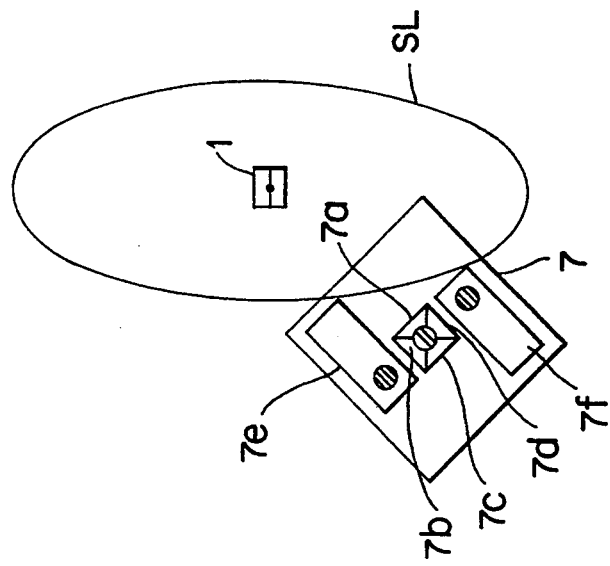
FIG. 5 shows the positional relation between the photodetector and the semiconductor laser device in an apparatus of the present application.

FIG. 5 illustrates the positional relation between the photodetector 7 and the semiconductor laser device 1 in a further optical pickup apparatus according to the present application. The construction of this embodiment is the same as that of the apparatus is line 33 FIG. 3 except that the the photodetector 7 of line 32 structured as shown in FIG. 5. In the photodetector 7 of this apparatus, the distance between the photodetecting region 7f and the laser device 1 is greater than that between the photodetecting region 7e and the laser device 1. These distances are selected in such a manner that the amounts of the light beams incident thereon are equal to each other when the tracking control is conducted properly. Therefore, the tracking error signal has no offset or equals zero when the tracking control is conducted properly. As the distances between the laser device 1 and the photodetecting regions 7e and 7f can be freely set considering the amount of the stray light impinging thereon, the photodetector 7 can be disposed closer to the semiconductor laser device 1, resulting in the reduced size and weight of the optical pickup apparatus.

In the above-described embodiments, the focus error is detected by the astigmatism method. The method for the focus error detection useful in the invention is not restricted to the astigmatism method, but can be selected from other methods known in the art. It will be easily understood for a skilled one in the art that the arrangements according to the invention which are described above can be combined in various ways.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical pickup apparatus comprising:
   a light source for emitting a laser light beam;
   an optical lens system for converging the laser light beam onto a recording medium;
   a photodetector for detecting the laser light beam reflected from the recording medium;
   a first diffracting means for dividing the light beam from said light source into a main beam for reading/recording data on the recording medium and a pair of sub-beams for sensing tracking error of the main beam; and
   a second diffracting means for introducing the reflected light beam from the recording medium into said photodetector;
   wherein said photodetector including two photodetecting regions onto which the pair of sub-beams impinge, respectively,
   the effective photodetecting areas of said photodetecting regions being different in size from each other,
   and wherein said photodetecting regions are located at different distances from said light source, and wherein said first and second diffracting means are provided with an antireflection means for preventing the light beam from being reflected.

2. An optical pickup apparatus comprising:
   a laser light source for emitting a laser light beam;
   an optical lens system for converging the laser light onto a recording medium;
   a photodetector for detecting the laser light beam reflected from the recording medium;
   a first diffracting means from dividing the light beam from said light source into a main beam for reading/recording data on the recording medium and a pair of sub-beams for sensing tracking error of the main beam; and
   a second diffracting means for introducing the reflected light beam from said recording medium into said photodetector;
   wherein said photodetector including two photodetecting regions onto which the pair of sub-beams impinge, respectively,
   the distance between one of said two photodetecting regions and said light source being different from that between the other of said two photodetecting regions and said light source,
   and wherein the effective photodetecting areas of said photodetecting regions are different in size from each other,
   and wherein said diffracting means is provided with an antireflection means for preventing the laser light beam from being reflected.

3. An optical pickup apparatus comprising:
   a laser light source for emitting a laser light beam;
   an optical lens system from converging the laser light onto a recording medium;
   a photodetector for detecting the laser light beam reflected from the recording medium;
   a first diffracting means for dividing the light beam from said light source into a main beam for reading/recording data on the recording medium and a pair of sub-beams for sensing tracking error of the main beam; and
   a second diffracting means for introducing the reflected light beam from the recording medium into said photodetector;
   wherein said photodetector including two photodetecting regions onto which the pair of sub-beams impinge, respectively,
   the effective photodetecting areas of said photodetecting regions being different in size from each other.

4. The optical pickup apparatus of claim 3, wherein a distance between one of said two photodetecting regions and said laser light source is different from a distance between the other of said two photodetecting regions and said laser light source.

5. The optical pickup apparatus of claim 3, wherein said diffracting means is provided with an antireflection means for preventing the laser light from being reflected.

6. An optical pickup apparatus comprising:
   a light source for emitting a laser light beam;
   an optical lens system for converging the laser light onto a recording medium;
   a photodetector for detecting the laser light beam reflected from the recording medium;
   a first diffracting means for dividing the light beam from said light source into a main beam for reading/recording data on the recording medium and a pair of sub-beams from sensing tracking error of the main beam; and
   a second diffracting means for introducing the reflected light beam from said recording medium into said photodetector;
   wherein said photodetector including two photodetecting regions onto which the pair of sub-beams impinge, respectively,
   a distance between one of said two photodetecting regions and said light source being different from a distance between the other of said two photodetecting regions and said light source.

7. The optical pickup apparatus of claim 6, wherein said diffracting means is provided with an antireflection means for preventing the laser light from being reflected.

* * * * *

UNITED STATES PATENT AND TRADEMARK OFFICE
CERTIFICATE OF CORRECTION

PATENT NO. : 5,408,450
DATED : April 18, 1995
INVENTOR(S) : Toshiya NAGAHAMA et al.

It is certified that error appears in the above-indentified patent and that said Letters Patent is hereby corrected as shown below:

Column 6, line 60, change "is line 33" to --of--.
Column 6, line 61, change "of line 32" to --is--.

Signed and Sealed this

Thirty-first Day of October 1995

Attest:

BRUCE LEHMAN

Attesting Officer

Commissioner of Patents and Trademarks